United States Patent
Büttner et al.

(10) Patent No.: US 12,244,436 B2
(45) Date of Patent: Mar. 4, 2025

(54) METHOD FOR DATA COMMUNICATION BETWEEN SUBSCRIBERS OF AN AUTOMATION SYSTEM

(71) Applicant: Beckhoff Automation GmbH, Verl (DE)

(72) Inventors: Holger Büttner, Berlin (DE); Hans Beckhoff, Verl (DE)

(73) Assignee: Beckhoff Automation GmbH, Verl (DE)

( * ) Notice: Subject to any disclaimer, the term of this patent is extended or adjusted under 35 U.S.C. 154(b) by 462 days.

(21) Appl. No.: 17/857,684

(22) Filed: Jul. 5, 2022

(65) Prior Publication Data
US 2022/0337451 A1 Oct. 20, 2022

Related U.S. Application Data

(63) Continuation of application No. PCT/EP2021/050467, filed on Jan. 12, 2021.

(30) Foreign Application Priority Data

Jan. 16, 2020 (DE) ..................... 10 2020 100 987.9

(51) Int. Cl.
H04L 12/40 (2006.01)
(52) U.S. Cl.
CPC .............. H04L 12/40182 (2013.01); *H04L 2012/4026* (2013.01)
(58) Field of Classification Search
CPC ............ H04L 12/40182; H04L 12/417; G05B 19/054; G05B 19/056
See application file for complete search history.

(56) References Cited

U.S. PATENT DOCUMENTS

| 5,499,247 A | 3/1996 | Matsuda et al. |
| 6,990,540 B2 | 1/2006 | Dalakuras et al. |

(Continued)

FOREIGN PATENT DOCUMENTS

| CN | 101300534 A | 11/2008 |
| CN | 110493170 A | 11/2019 |

(Continued)

OTHER PUBLICATIONS

Office Action dated Jan. 3, 2023 in connection with Chinese patent application No. 202180009284.9, 6 pages including English translation.

(Continued)

*Primary Examiner* — Jamal Javaid
(74) *Attorney, Agent, or Firm* — Dorsey & Whitney LLP (57) ABSTRACT

A method for data communication between subscribers of an automation system includes a first passive subscriber and a second passive subscriber receiving a write request sent by an active subscriber, determining a first transmission time point for transmitting a first reply message by the first passive subscriber, transmitting the first reply message at the first transmission time, and receiving the first reply message. The method also includes determining a second transmission time for transmitting a second reply message by the second passive subscriber, transmitting the second reply message at the second transmission time, receiving the second reply message, and interpreting the first reply message and the second reply message as segments of a data packet.

10 Claims, 5 Drawing Sheets

(56) References Cited

U.S. PATENT DOCUMENTS

| | | | |
|---|---|---|---|
| 7,668,994 | B2 | 2/2010 | Albrecht et al. |
| 8,015,324 | B2 | 9/2011 | Klotz et al. |
| 8,180,940 | B2 | 5/2012 | Korrek |
| 11,290,881 | B2 | 3/2022 | Hubert et al. |
| 2007/0033312 | A1 | 2/2007 | Flandre et al. |
| 2009/0055564 | A1 | 2/2009 | Klotz et al. |
| 2015/0381538 | A1* | 12/2015 | Bunte .................. H04L 51/212 709/206 |

FOREIGN PATENT DOCUMENTS

| | | | |
|---|---|---|---|
| DE | 10147445 | A1 | 4/2003 |
| DE | 102005053103 | A1 | 5/2007 |
| DE | 102006051222 | B3 | 3/2008 |
| DE | 102007053667 | A1 | 5/2009 |
| DE | 502005011032 | | 4/2011 |
| EP | 1748338 | A1 | 1/2007 |
| EP | 2028797 | A1 | 2/2009 |

OTHER PUBLICATIONS

"EtherCAT—the Ethernet Fieldbus," EtherCAT Technology Group, Nov. 2012, 21 pages.

Office Action dated Jan. 16, 2020 in connection with German patent application No. DE 10 2020 100 987.9, 23 pages including English translation.

International Search Report and Written Opinion dated Apr. 19, 2021 in connection with International Patent Application No. PCT/EP2021/050467, 16 pages including English translation.

* cited by examiner

METHOD FOR DATA COMMUNICATION BETWEEN SUBSCRIBERS OF AN AUTOMATION SYSTEM

CROSS-REFERENCE TO RELATED APPLICATIONS

This patent application is a continuation of International Patent Application PCT/EP2021/050467, filed 12 Jan. 2021, entitled METHOD FOR DATA COMMUNICATION BETWEEN PARTICIPANTS OF AN AUTOMATION SYSTEM, which claims priority of German patent application DE 10 2020 100 987.9, filed 16 Jan. 2020, entitled VERFAHREN ZUR DATENKOMMUNIKATION ZWISCHEN TEILNEHMERN EINES AUTOMATISIERUNGSSYSTEMS, the disclosure contents of each of which are hereby incorporated by reference herein, in the entirety and for all purposes.

FIELD

The present application provides a method for data communication in an automation system, in particular between an active subscriber and at least two passive subscribers.

BACKGROUND

Automation networks of automation systems are often operated as so-called field-bus systems. Field-bus systems are industrial bus systems that allow for real-time control of the machines or systems of the automation network. As a rule, the machines or systems of the automation network are controlled with the aid of programmable logic controllers (PLCs). The PLC uses the field-bus system for the communication of the field devices, e.g. sensors and actuators of the machines or systems of the automation network comprising the PLC.

Field-bus systems are usually divided up into active and passive subscribers of the bus system, wherein active subscribers are characterized by the fact that they may start data communications between the subscribers by sending out corresponding messages, while passive subscribers are usually limited to responding to messages sent out by the active subscriber. In such field-bus systems, data may be exchanged by data telegrams which, depending on the field bus protocol used, comprise a range of additional information, such as addresses of the subscribers participating in the data communication, in addition to the user data to be transmitted.

In complex field-bus systems, such as EtherCAT, a plurality of passive subscribers may be addressed by a joint data telegram and processed in passing, while the telegram may be forwarded from one subscriber to the next and processed by a plurality of subscribers. This allows for particularly fast communication since a smaller number of data telegrams have to be transmitted.

For many applications within an automation system, however, such field-bus systems are embodied to be more complex than would be necessary for the application. For example, for the control of simple sensors, known field bus protocols are too costly and too complex and offer possibilities that are not needed for the transmission of data of technically simple sensors that are not very complex. The high effectiveness and performance of complex field-bus systems usually come at the price of a high protocol overhead as well as complex and costly cabling and hardware configurations. For the less complex applications mentioned above, these field-bus systems are therefore not efficient solutions.

Field buses that are not based on a point-to-point connection, such as PROFIBUS or CAN, in the following also referred to as field buses with party-line configuration, have the advantage that a plurality of different subscribers may be addressed via joint messages. Thus, e.g. input data may be transmitted from the controller to a plurality of different sensors or actuators with the aid of a common data telegram. In addition, such bus systems may be implemented with comparatively low complexity in terms of both protocol design and cabling and hardware configuration, and therefore represent an attractive alternative for less complex systems.

However, a disadvantage of bus systems with a party line configuration is that despite the common addressing of the subscribers, e.g. by transmitting a common data telegram with corresponding input data, a transmission of corresponding output data, e.g. of measurement data of different sensors, is only possible via individual data telegrams, so that each sensor participating in the data communication must transmit its measurement data via an individual data telegram.

SUMMARY

The present application provides a method for data communication between subscribers in an automation system that allows for robust and compatible data communication that may be implemented on a technically simple communication system.

EXAMPLES

A method for data communication between subscribers of an automation system having an active subscriber and at least two passive subscribers is provided. At least a first passive subscriber and a second passive subscriber is provided, wherein the active subscriber and the passive subscribers are interconnected via a bus system, wherein the active subscriber is configured to initiate data communication by sending out communication requests, and wherein the passive subscribers are configured to transmit respective reply messages in response to the communication requests. The first passive subscriber comprises a first switch-on unit for determining a first transmission time for sending out a first reply message via the first passive subscriber, the second passive subscriber comprises a second switch-on unit for determining a second transmission time for sending out a second reply message by the second subscriber, and the method comprises:

receiving a write request sent by the active subscriber to send out reply messages via the first passive subscriber and via the second passive subscriber in a first receiving step;

determining the first transmission time for transmitting the first reply message via the first switch-on unit of the first passive subscriber in a first determining step, wherein the first transmission time corresponds to a first number of data units received by the first passive subscriber according to a precisely defined data transmission rate after receiving the write request;

sending out of the first reply message at the first transmission time via the first passive subscriber in a first reply step;

receiving the first reply message via the active subscriber and the second passive subscriber in a second receiving step;

determining the second transmission time for sending out the second reply message via the second switch-on unit in a second determining step, wherein the second transmission time corresponds to a second number of data units received by the second passive subscriber according to a precisely defined data transmission rate after receiving the write request;

sending out the second reply message at the second transmission time via the second passive subscriber in a second reply step;

receiving the second reply message via the active subscriber and the first passive subscriber in a third receiving step; and interpreting the first reply message and the second reply message as a first data segment and a second data segment of a data packet with the aid of the active subscriber in an interpreting step.

This has the technical advantage that a method for data communication between subscribers of an automation system may be provided in which a plurality of passive subscribers of the automation system may be addressed by an active subscriber via a joint write request or communication request, and the corresponding reply messages of the passive subscribers may be combined in a shared data element and interpreted as a coherent data element, e.g. a data telegram.

For this purpose, a plurality of passive subscribers may be connected to an active subscriber of the automation system via a bus system, wherein the bus system is set up to provide data units transmitted by the subscribers simultaneously to the respective other subscribers of the bus system. Thus, a communication request sent by the active subscriber is received simultaneously by all active subscribers of the bus system.

BRIEF DESCRIPTION OF THE DRAWINGS

The invention is explained in more detail with reference to the accompanying figures, which show.

DETAILED DESCRIPTION

For the purposes of the application, an active subscriber is a subscriber of a bus system that is set up to initiate data communication between the subscribers of the bus system by sending corresponding communication requests to other subscribers of the bus system. In the sense of the application, a passive subscriber of a bus system is a subscriber that cannot actively initiate a data communication, but is exclusively set up to react to corresponding communication requests by sending corresponding reply messages. In a master-slave system, an active subscriber could be implemented by a master subscriber and a passive subscriber by a slave subscriber.

In order to initiate data communication or to request transmission of corresponding reply messages, it is therefore sufficient for the active subscriber to simply send out a communication request to the respective passive subscribers of the bus system. This avoids the requirement of addressing each single passive subscriber individually with a communication request to send corresponding reply messages. This may reduce a number of data units required for a data communication to be exchanged between the active subscriber and the passive subscribers. As a result, data communication between the active subscriber and the passive subscribers may be accelerated and simplified.

Each of the passive subscribers of the automation system comprises a switch-on unit which is set up to determine a point in time for sending a reply message to a corresponding communication request. The switch-on units of the passive subscribers which are each prompted to send out a corresponding reply message via a communication request sent by the active subscriber, may be used to determine a transmission time for each subscriber at which it may transmit the corresponding reply message to the active subscriber and, as the case may be, to the other passive subscribers without causing a collision with another passive subscriber sending at the same time. The switch-on units of the individual passive subscribers may thus be used to implement a transmission order of the plurality of passive subscribers in which each passive subscriber is assigned a transmission time at which only the respective passive subscriber may transmit a corresponding reply message. In this way, collisions or simultaneous transmission of a plurality of reply messages by different passive subscribers may be avoided.

The switch-on units of the passive subscribers are set up to detect a number of data units received by the respective passive subscriber and to determine a corresponding transmission time for the respective passive subscriber according to a predetermined number of data units to be received. In this way, an individual number of received data units may be defined for the respective passive subscriber in each switch-on unit of the passive subscribers of the bus system.

Thus, a switch-on unit of a passive subscriber may count the data units received from the passive subscriber and determine a number of the received data units and, if the number of the received data units corresponds to the predetermined number, define the respective time of receipt of the number of data units as the transmission time and cause a corresponding reply message to be transmitted. By defining an individual predetermined number of data units to be received in each switch-on unit of each passive subscriber of the bus system, it may be achieved that each passive subscriber transmits a corresponding reply message at the time when the respective passive subscriber has received a number of data units corresponding to the predetermined number of data units to be received. Thus, it may be achieved that each of the passive subscribers of the bus system may send out a corresponding reply message at a time reserved for it, without simultaneously sending out different reply messages via different passive subscribers.

The reply messages sent out by the passive subscribers may be interpreted by the active subscriber as data segments of a coherent data packet. The coherent data packet may e.g. be a data telegram. This may be used to ensure that the individual reply messages from the various passive subscribers may be further considered as a coherent data packet or data telegram. This is e.g. advantageous if the individual information of the passive subscribers, which was communicated to the active subscriber in corresponding reply messages, represents parts of an overall status of a machine part of the automation system and only the overall status of the machine part is of interest for further processing of the information. By interpreting the individual reply messages of the passive subscribers as segments of a coherent data packet, a simplified further processing and forwarding of the information of the individual passive subscribers may be achieved.

For the purposes of the application, a communication request is a request or command that is transmitted from the active subscriber to the passive subscribers and may result in the transmission of a corresponding reply message by the respective passive subscribers. For example, a communication request may include a read command and corresponding output data such that the passive subscribers are requested to read the received output data from the active subscriber. Alternatively, a communication request may comprise a write command requesting the respective passive subscribers to transmit corresponding input data of the passive subscriber to the active subscriber via a corresponding reply message.

In terms of the application, a write request is a communication request that includes a write command, and requests the respective passive subscribers to send out input data by corresponding reply messages.

For the purposes of the application, a reply message is a message sent by a passive subscriber in response to a communication request. A reply message may e.g. include input data of the respective passive subscriber, possibly measurement data or status data of the respective subscriber.

For the purposes of the application, a passive subscriber may be a sensor or actuator of an automation system.

In the sense of the application, a message is a signal sequence of signals that may be transmitted via the respective bus system and that is set up to transmit an information content. In the sense of the application, the first and second reply messages and the error messages of the passive subscribers as well as the write requests or communication requests of the active subscriber are messages in the sense mentioned above. A message may comprise a plurality of data units or consist of only one data unit.

For the purposes of the application, a data unit is a bit, a byte or a unit for digital data transmission commonly used in the state of the art.

According to an embodiment, the method further comprises:
  determining a first checksum by the first passive subscriber in a first checksum-determining step, wherein the first checksum is generated via the write request issued by the active subscriber, via the first reply message sent by the first passive subscriber and the second reply message received by the first passive subscriber; and/or
  determining a second checksum by the second passive subscriber in a second checksum-determining step, wherein the second checksum is generated via the write request issued by the active subscriber, the first reply message received by the second passive subscriber and the second reply message issued by the second passive subscriber;
  determining a third checksum by the active subscriber in a third checksum-determining step, wherein the third checksum is generated via the write request issued by the active subscriber over the first reply message received from the active subscriber and the second reply message received from the active subscriber;
  sending out the third checksum via the active subscriber to the first passive subscriber and the second passive subscriber in a checksum-transmitting step;
  checking the third checksum for correspondence with the first checksum by the first passive subscriber in a first checksum-checking step; and/or
  checking the third checksum for correspondence with the second checksum by the second passive subscriber in a second checksum-checking step; and
  if the third checksum does not match the first checksum and/or the second checksum, sending out an error message via the first passive subscriber and/or the second passive subscriber in an error-message-transmitting step; and
  discarding the first reply message and/or the second reply message and/or the data packet by the active subscriber and/or the first passive subscriber and/or the second passive subscriber in a discarding step.

This achieves the technical advantage of providing a simple and fast solution for checking the accuracy of the transmitted data.

Each reply message sent by a passive subscriber is available not only to the active subscriber but also to all other passive subscribers in the bus system. After the last reply message of the last passive subscriber of the bus system has been sent, checksums of the sent reply messages may be created by each passive subscriber as well as the active subscriber. The respective checksums are based on the write request or communication request sent by the active subscriber and on all reply messages sent. This avoids having to generate an individual checksum for each reply message to verify the data transmitted in the respective reply message.

After generating the checksums with the aid of each of the subscribers of the bus system, the checksum generated by the active subscriber is transmitted to the passive subscribers by the active subscriber and compared by the passive subscribers with the respective checksums generated by the passive subscribers. If there is a discrepancy between the checksum generated by the active subscriber and a checksum generated by one of the passive subscribers, a corresponding error message is sent out and the reply messages sent out are discarded as faulty. Only checksums that include the write request or communication request sent out by the active subscriber and all sent reply messages are generated and thus interpreted as checksums of the coherent data packet that includes all sent reply messages as corresponding data segments.

This means that a small number of checksums are generated and transmitted, which speeds up and simplifies data communication between the subscribers of the bus system. Since each subscriber of the bus system only has to generate one checksum for the write request or communication request sent by the active subscriber and for all the reply messages sent, the computing effort required to generate the checksums may be reduced, thus accelerating data communication.

Since only the checksum generated by the active subscriber is transmitted to the other subscribers of the bus system, occupancy of the bus system by transmitting checksums may be reduced to a minimum, thus accelerating data communication between the subscribers of the bus system in terms of time.

The active subscriber may be assigned a waiting time for receiving an error message from at least one of the passive subscribers, during which the active subscriber waits for the receipt of a corresponding error message by at least one of the passive subscribers after sending the third checksum.

An error message may be realized by bringing the voltage level of the bus system to a low level for a predetermined period of time by at least one passive subscriber. As soon as a passive subscriber determines a mismatch between the third checksum and a corresponding checksum of the passive subscriber, the latter brings the voltage level of the bus system to a low level. Hereby, for the active subscriber as well as for all further passive subscribers, the data communication is indicated as faulty and thus as failed. Further passive subscribers may, if they also detect mismatches between the third checksum and the checksums of the passive subscribers, also send out a corresponding error message or tune into the error message that has already been sent. Thus, several subscribers may send error messages simultaneously without collisions. Also, no individual transmission times have to be assigned to the individual passive subscribers for sending the error messages.

For the purposes of the application, a checksum is a verification indication that makes it possible to check the correctness of the transmitted data. A checksum may comprise various methods known in the prior art for generating corresponding verification information.

According to an embodiment, the method further comprises: if the third checksum matches the first checksum and the second checksum, interpreting the third checksum as a test segment of the data packet in the interpreting step.

This achieves the technical advantage that the checksum generated to verify the correctness of the transmitted data of the sent reply messages may be used as a checksum for the data packet comprising the respective reply messages for further processing or transmitting the data packet. This avoids the need to generate an additional checksum for sending the data packet. This in turn may accelerate data communication and reduce the computing effort of the active subscriber. If the active subscriber does not receive an error message sent by the passive subscribers during the corresponding waiting period after sending a third checksum, the active subscriber may interpret this absence of a corresponding error message as a match between the third checksum and the checksums generated by the passive subscribers. Alternatively, if the third checksum matches the checksums generated by passive subscribers, the passive subscribers may send a common match message or individual match messages for each passive subscriber within the waiting period, confirming the match of the third checksum with the checksums of the passive subscribers. Receipt of such match messages within the waiting period may therefore be interpreted by the active subscriber as a match of the third checksum with the checksums of the passive subscribers. If, on the other hand, the active subscriber does not receive such a match message during the waiting period, this may be interpreted by the active subscriber as a mismatch of the third checksum and the checksums of the passive subscribers and accordingly as a faulty transmission of at least one of the respective reply messages of the passive subscribers to the corresponding write request.

According to an embodiment, the first determining step comprises:
    counting the data units received after receipt of the write request by the first passive subscriber until the first number is reached by the first switch-on unit in a first counting step;

wherein the second determining step comprises:
    counting the data units received after receipt of the write request by the second passive subscriber until the second number is reached by the second switch-on unit in a second counting step.

This achieves the technical advantage that a solution may be provided which is technically simple to implement for determining the transmission times of the individual passive subscribers for transmitting the respective reply messages. This in turn provides an easy-to-implement method for generating a reliable transmission order of individual reply messages from various passive subscribers of the bus system.

An individual number of data units to be received from the respective passive subscriber may be defined in each switch-on unit of each passive subscriber. When receiving a communication request from an active subscriber or corresponding reply messages from further passive subscribers of the bus system, a switch-on unit of each passive subscriber may count the data units received from the passive subscriber and determine a number of data units received. If the number of received data units reaches the number of data units to be received defined in the respective switch-on unit, the switch-on unit determines the respective time of receipt of the number of data units as the time of transmission and initiates transmission of a corresponding reply message.

Thus, by defining different numbers of data units to be received for different switch-on units of different passive subscribers, it may be achieved that each passive subscriber sends a corresponding reply message at a time when no other passive subscriber sends a reply message. In this way, the sending out of different messages by different subscribers of the bus system may be avoided.

According to an embodiment, the first number is any numerical value, wherein the second number is not less than a sum of the first number and a first data unit number of the first reply message, wherein the first data unit number corresponds to a number of data units of the first reply message.

The technical advantage of this is that a simple solution may be provided for generating a transmission order of reply messages to be sent out by different passive subscribers. By determining a particular number of data units to be received for each passive subscriber, it may be achieved that each passive subscriber transmits reply messages at a time when no other passive subscriber transmits corresponding reply messages. By setting a first number of a first switch-on unit of a first passive subscriber to an arbitrary numerical value, for example to the numerical value 0, it may be achieved that the first subscriber sends out a corresponding first reply message immediately after receiving a communication request or write request from the active subscriber.

A receipt of a message in the sense of the application comprises a receipt of all data units of the sent message by the corresponding recipient of the message. A receipt time of a message by a subscriber here corresponds to the time of the receipt of the last received data unit of the message.

By setting the first number of the first switch-on unit of the first passive subscriber to the numerical value 0, it is achieved that the first passive subscriber sends out a corresponding first reply message immediately after receiving the last data unit of the corresponding write request or communication request. Immediate sending in the sense of the application indicates that a corresponding message is sent out before a further data unit is received.

By setting a second number of a second switch-on unit of a second passive subscriber to a value corresponding to a sum of the first number and a first data unit number of the first reply message of the first passive subscriber, it may be achieved that the second subscriber transmits a corresponding second reply message immediately after receiving the first reply message of the first passive subscriber. A data unit number of a reply message is, in the sense of the application, a number of data units of the respective reply message.

By making the second number of the second passive subscriber at least equal to the data unit number of the first reply message of the first passive subscriber, it may be ensured that the second subscriber transmits a second reply message immediately after receiving the first reply message. For further passive subscribers, the procedure is analogous in that the respective numbers of data units to be received by the respective passive subscribers correspond to a sum of the data unit numbers of the reply messages of the passive subscribers arranged before the respective passive subscriber in the transmission order.

In terms of the application, the first passive subscriber is the passive subscriber of the bus system that first sends a corresponding first reply message after receiving the communication request or write request of the active subscriber. Accordingly, a second passive subscriber is a passive subscriber that sends a second reply message after the first passive subscriber in the transmission order.

According to an embodiment, the first number is defined in the first switch-on unit, the second number being defined in the second switch-on unit.

This achieves the technical advantage that a transmission order of the reply messages to be transmitted may be achieved which is easy to implement. By defining in each switch-on unit of each passive subscriber a number of data units to be received by the respective passive subscriber and an associated transmission time for the transmission of a corresponding reply message by the respective passive subscriber, a transmission order of the reply messages to be transmitted may be defined so that for each communication request transmitted by the active subscriber, the passive subscribers transmit corresponding reply messages in an unchangable transmission order.

According to an embodiment, the write request further comprises a data packet length of the data packet, wherein the data packet length of the data packet comprises at least a sum of a first data unit number of the first reply message and a second data unit number of the second reply message, wherein the second data unit number corresponds to a number of data units of the second reply message.

This achieves the technical advantage that the individual passive subscribers may be addressed in a simple manner Each switch-on unit of each passive subscriber determines the reply messages received from the respective passive subscriber or counts the data units of the respective reply messages received from the passive subscriber.

In addition, each switch-on unit of each passive subscriber recognizes the number of data units that the respective passive subscriber must have received before it may send a corresponding reply message, i.e. the position within the transmission order of the individual reply messages of the different passive subscribers. If this number of the respective switch-on unit is outside the data packet length of the data packet, the respective switch-on unit knows that no reply message is to be sent in response to the respective communication request.

The data packet length of the data packet contained in the write request sent by the active subscriber thus addresses only those passive subscribers for which a sum of the respective data unit numbers of the corresponding reply messages is included in the data packet length of the data packet. If, for example, the first passive subscriber sends a first reply message in response to a corresponding write request, the number of data units of which corresponds to the data packet length of the data packet defined in the write request, the second switch-on unit of the second subscriber and all other switch-on units of the other passive subscribers know that no second reply message or further reply messages are to be sent in response to the corresponding write request. The corresponding write request with the specified data packet length of the data packet would therefore only address the first passive subscriber.

If the automation system comprises further passive subscribers in addition to the first passive subscriber and the second passive subscriber, the data packet length may comprise further numbers of data units. In this way, the data packet length may be used to address further passive subscribers in addition to the first passive subscriber and the second passive subscriber for sending corresponding reply messages. Alternatively, only the first passive subscriber may be addressed by a corresponding data packet length.

In addition, the specified data packet length of the data packet is used to signal to the passive subscribers when the last reply message was sent by the last passive subscriber in the transmission order, so that the passive subscribers may create a corresponding checksum for all reply messages sent. For this purpose, the switch-on units of the respective passive subscribers may register and count all data units received from the receipt of the corresponding communication request or write request to the last data unit of the last reply message.

According to an embodiment, the active subscriber, the first passive subscriber and the second passive subscriber each transition from a receiving mode to a transmitting mode exclusively for transmitting data units, wherein sent-out data units are embodied with a start bit, a stop bit and a parity bit, wherein the start bit of a data unit represents the start and the stop bit of a data unit represents the end of the respective data unit, and wherein the bus system is operated at a high voltage level between the transmission of data units.

This achieves the technical advantage that simple data communication may be achieved between the subscribers of the bus system. Similar to the Universal Asynchronous Receiver Transmitter UART, the bus system may be set up to operate at a high level in an idle state. The individual subscribers of the bus system are continuously in this mode, in which they may read out data transmitted via the bus system. For transmission, only one subscriber at a time may switch to a transmitting mode and send out corresponding messages or data units, which may be received by the remaining subscribers in receiving mode. To identify the individual sent-out messages, each message comprises a start bit and a stop bit, via which the respective subscribers in receiving mode may identify the sent-out messages as corresponding messages. This allows a simple bus system to be implemented that includes low protocol complexity and simple wiring.

According to an embodiment, the bus system is embodied as a party-line bus system, wherein transmitted communication requests and/or reply messages are simultaneously available to all subscribers of the bus system.

This achieves the technical advantage that a simple bus system may be implemented which is set up to enable addressing of several subscribers via a single transmitted message. In order to address the individual passive subscribers via the active subscriber, it is sufficient for the active subscriber to send a common communication request or write request. Individual addressing by sending individual messages to individual passive subscribers may thus be avoided. Data communication between subscribers in the bus system may thus be simplified and accelerated.

According to an embodiment, the first reply message comprises user data of the first passive subscriber and the second reply message comprises user data of the second passive subscriber.

This achieves the technical advantage that a simple solution may be provided for transmitting user data of individual subscribers of an automation system. User data may e.g. be measurement data or status data of the respective subscribers of the automation system.

According to an embodiment, the first passive subscriber and the second passive subscriber are each embodied as an actuator or sensor of the automation system, with the active subscriber being a bus master of the bus system.

This achieves the technical advantage that a method for data communication between subscribers of an automation system may be provided, which has a wide range of applications. The method may thus be used to control various sensors and actuators of an automation system.

Figure 1:
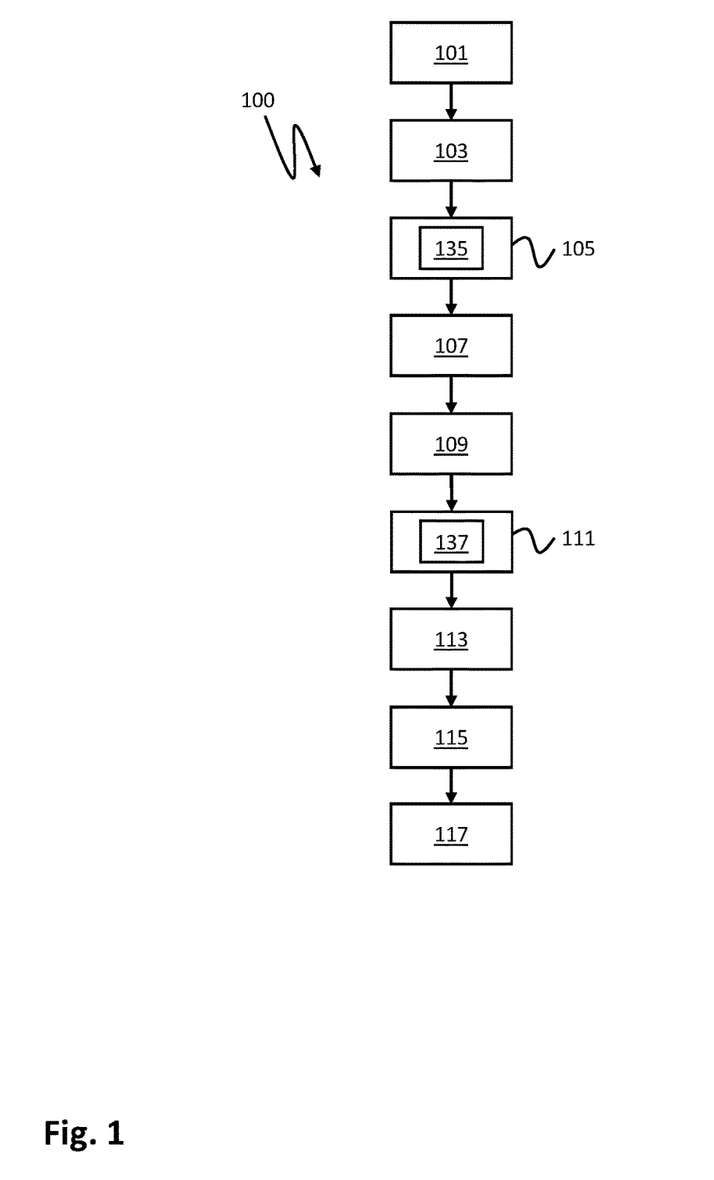
FIG. 1 is a flowchart of a method for data communication between subscribers of an automation system according to an embodiment.

FIG. 1 shows a flowchart of a method 100 for data communication between subscribers of an automation system according to an embodiment.

Figure 3:
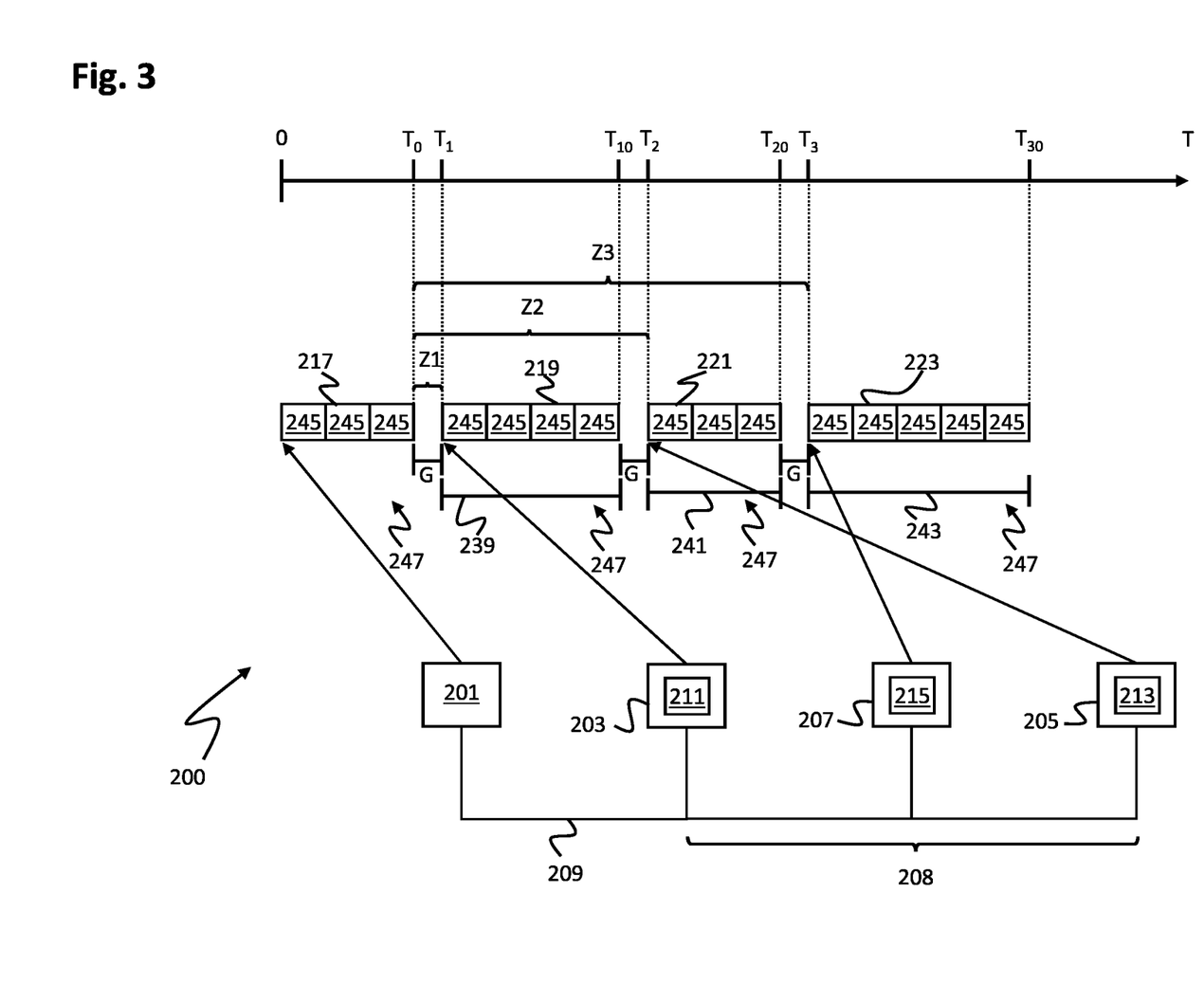
FIG. 3 is a schematic depiction of a time sequence of transmitting messages according to the method for data communication between subscribers of an automation system according to an embodiment.
Figure 4:
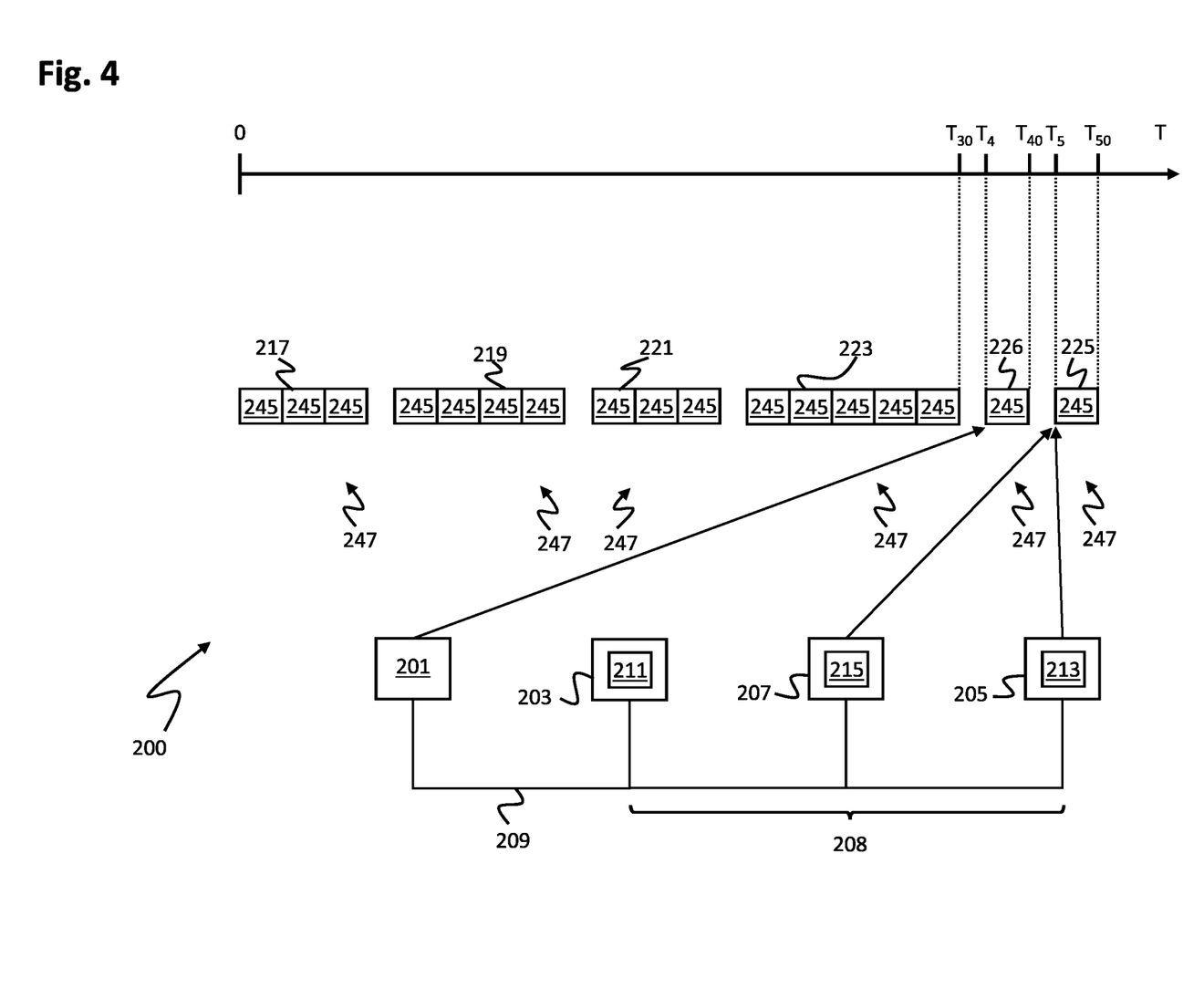
FIG. 4 is a further schematic depiction of a time sequence a sending messages according to the method for data communication between subscribers of an automation system according to an embodiment.
Figure 5:
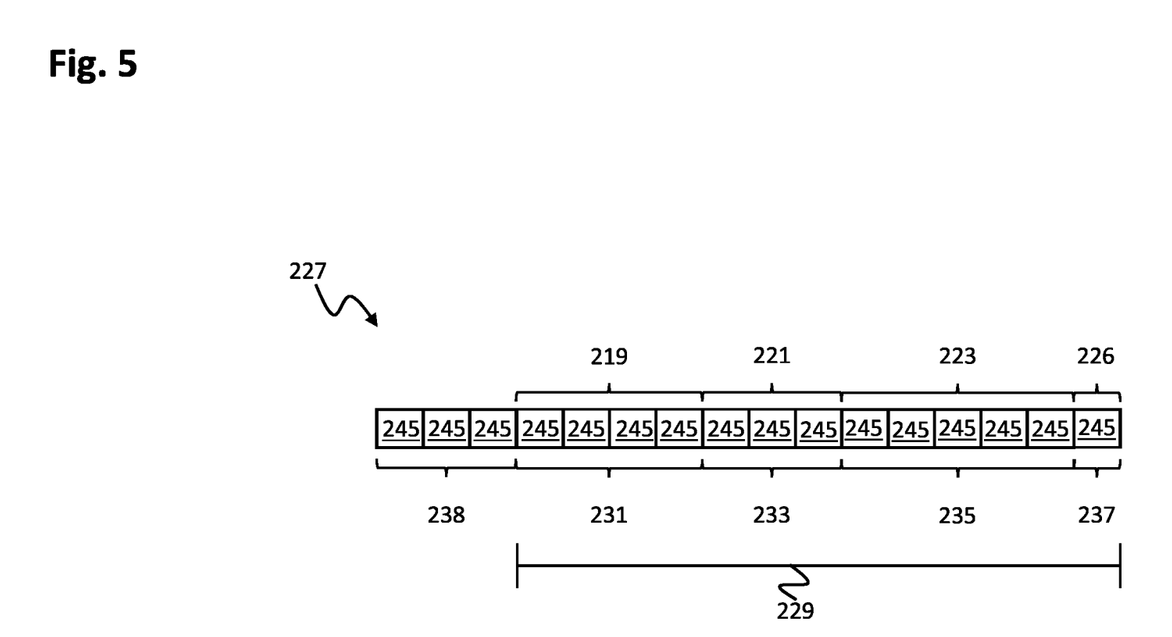
FIG. 5 is a schematic depiction of a data packet generated by the provided method according to an embodiment.

The method 100 may relate to an automation system 200 comparable to the automation system shown in FIG. 3 to FIG. 5. The description of the method 100 in FIG. 1 is presented with reference to FIGS. 3 to 5.

According to the embodiment of FIG. 1, the automation system comprises at least an active subscriber and at least a first passive subscriber and a second passive subscriber, which are connected to each other via a bus system.

An active subscriber is set up to initiate data communication between the active subscriber and passive subscribers of the automation system by sending communication requests. The passive subscribers, on the other hand, are set up to send corresponding reply messages in response to the communication requests of the active subscriber.

In the embodiment shown in FIG. 1, the first passive subscriber comprises a first switch-on unit for determining a first transmission time for transmitting a first reply message by the first passive subscriber, and the second passive subscriber comprises a second switch-on unit for determining a second transmission time for transmitting a second reply message by the second subscriber.

According to FIG. 1, the method 100 comprises the following steps:
  receiving a write request sent out by the active subscriber to send reply messages via the first passive subscriber and the second passive subscriber in a first receiving step 103;
  determining the first transmission time for transmitting the first reply message via the first switch-on unit of the first passive subscriber in a first determining step 105, wherein the first transmission time corresponds to a first number of data units received by the first passive subscriber according to a precisely defined data transmission rate after receiving the write request;
  sending out the first reply message at the first transmission time via the first passive subscriber in a first reply step 107;
  receiving of the first reply message by the active subscriber and the second passive subscriber in a second receiving step 109;
  determining the second transmission time for transmitting the second reply message by the second switch-on unit of the second passive subscriber in a second determining step 111, wherein the second transmission time corresponds to a second number of data units received by the second passive subscriber according to a precisely defined data transmission rate after receiving the write request;
  sending out the second reply message at the second transmission time via the second passive subscriber in a second reply step 113;
  receiving the second reply message via the active subscriber and the first passive subscriber in a third receiving step 115; and
  interpreting the first reply message and the second reply message as a first data segment and a second data segment of a data packet by the active subscriber in an interpreting step 117.

In a transmitting step 101, the active subscriber sends a write request to the first passive subscriber and the second passive subscriber. The write request is a communication request and comprises at least one request to send corresponding reply messages via the first passive subscriber and the second passive subscriber. The write request may alternatively additionally comprise a data packet length defining a number of data units expected to be sent by the active subscriber in response to the write request in the form of the first reply message from the first passive subscriber and the second reply message from the second passive subscriber.

In the first receiving step 103, the first passive subscriber and the second passive subscriber of the automation system receive the write request issued by the active subscriber. By the write request of the active subscriber, both the first passive subscriber and the second passive subscriber are addressed and requested to send a corresponding reply message.

According to an embodiment, the bus system may be embodied as a party-line bus system. This ensures that each sent-out message is made available to each of the subscribers in the bus system. Furthermore, it may be achieved that the sent-out messages are received simultaneously by all other subscribers of the bus system.

After receiving the sent-out write request via the first passive subscriber, in the first determining step 105 the first point in time for transmitting the first reply message by the first passive subscriber is determined by the first switch-on unit of the first passive subscriber. The first transmission time is defined here as a number of data units received by the first passive subscriber according to a precisely defined data transmission rate. According to an embodiment, the first number thus defined may be defined and stored in the first switch-on unit of the first passive subscriber. The sending of the first reply message by the first passive subscriber is thus coupled to a number of data units received by the first subscriber after receipt of the write request. As soon as the first passive subscriber has received a number of data units that corresponds to the defined first number after receiving the write request, the first switch-on unit defines the time of receipt of the last data unit as the first transmission time and initiates transmission of the first reply message in response to the received write request of the active subscriber.

In the embodiment shown in FIG. 1, the first switch-on unit for this purpose counts the data units received by the first passive subscriber after receiving the write request in a first counting step 135.

According to an embodiment, the first number may be set to any numerical value, for example to the value 0. If the first number corresponds to the value 0, the first switch-on unit determines the first transmission time as the time of receipt of the write request, in particular the time of receipt of the last data unit of the write request. The first transmission time thus immediately follows the receipt of the write request.

After determining the first transmission time, a first reply message is transmitted by the first passive subscriber in the first reply step 107.

The first reply message may comprise user data of the first subscriber. In particular, the first reply message may contain measurement data or status data of the first passive subscriber, wherein the first passive subscriber may in particular be an actuator or sensor of the automation system.

In particular, the first reply message may be embodied as a data packet that comprises only user data. Alternatively, the first reply message may be embodied as a data packet that comprises a minimum protocol overhead in addition to user data.

After sending out the first reply message, the first reply message is received by the active subscriber and the second passive subscriber in the second receiving step 109. All sent messages are received by all subscribers of the automation system or the bus system, with the exception of the transmitting subscriber.

Subsequently, in the second determining step 111, the second switch-on unit of the second passive subscriber determines the second transmission time for the transmission of the second reply message by the second passive subscriber. The second transmission time corresponds to a second number of data units received by the second passive subscriber in accordance with the predefined data transmission rate. In accordance with the determination of the first transmission time point by the first switch-on unit, in a second counting step 137 the second switch-on unit for this purpose carries out a counting process of the data units received starting with the receipt of the write request by the second passive subscriber. As soon as the second switch-on unit has registered a number of received data units that corresponds to the defined second number, the switch-on unit initiates the transmission of a second reply message by the second passive subscriber.

Analogous to the first reply message, the second reply message may comprise user data of the second passive subscriber, in particular measurement data or status data of the second subscriber. In analogy to the first passive subscriber, the second passive subscriber may be a sensor or an actuator of the automation system.

According to an embodiment, the first number of the first switch-on unit may be set to any numerical value. The second number may correspond to a sum of the first number and a data unit number of the first reply message, wherein a data unit number of a reply message corresponds to a number of data units of the respective reply message. For example, the first number may be set to a numerical value of 0, resulting in that the first reply message is sent out immediately after the write request is received, in particular immediately after the last data unit of the write request is received by the first passive subscriber. The first reply message may comprise a first data unit number describing a number of data units comprised by the first reply message. Thus, by defining the second number as the sum of the first number of the first switch-on unit and the first data length of the first reply message, it is achieved that the second reply message is sent out immediately after the first reply message has been received by the second passive subscriber. For this purpose, the second switch-on unit counts all data units received from the second passive subscriber after receipt of the write request until the received data units reach the second number and results in the sending of the second reply message.

Subsequently, in the second reply step 113, the second reply message is transmitted by the second passive subscriber at the second transmission time.

Thereupon, in the third receiving step 115, the second reply message is received by the active subscriber and the first passive subscriber.

Upon receipt of the second reply message by the active subscriber, the first reply message and the second reply message are interpreted as the first data segment and the second data segment of the data packet by the active subscriber in the interpreting step 117. By interpreting the first reply message and the second reply message as first and second data segments of a data element, it is achieved that the individual reply messages of the passive subscribers may be further processed in a coherent data packet, in particular a data telegram.

Figure 2:
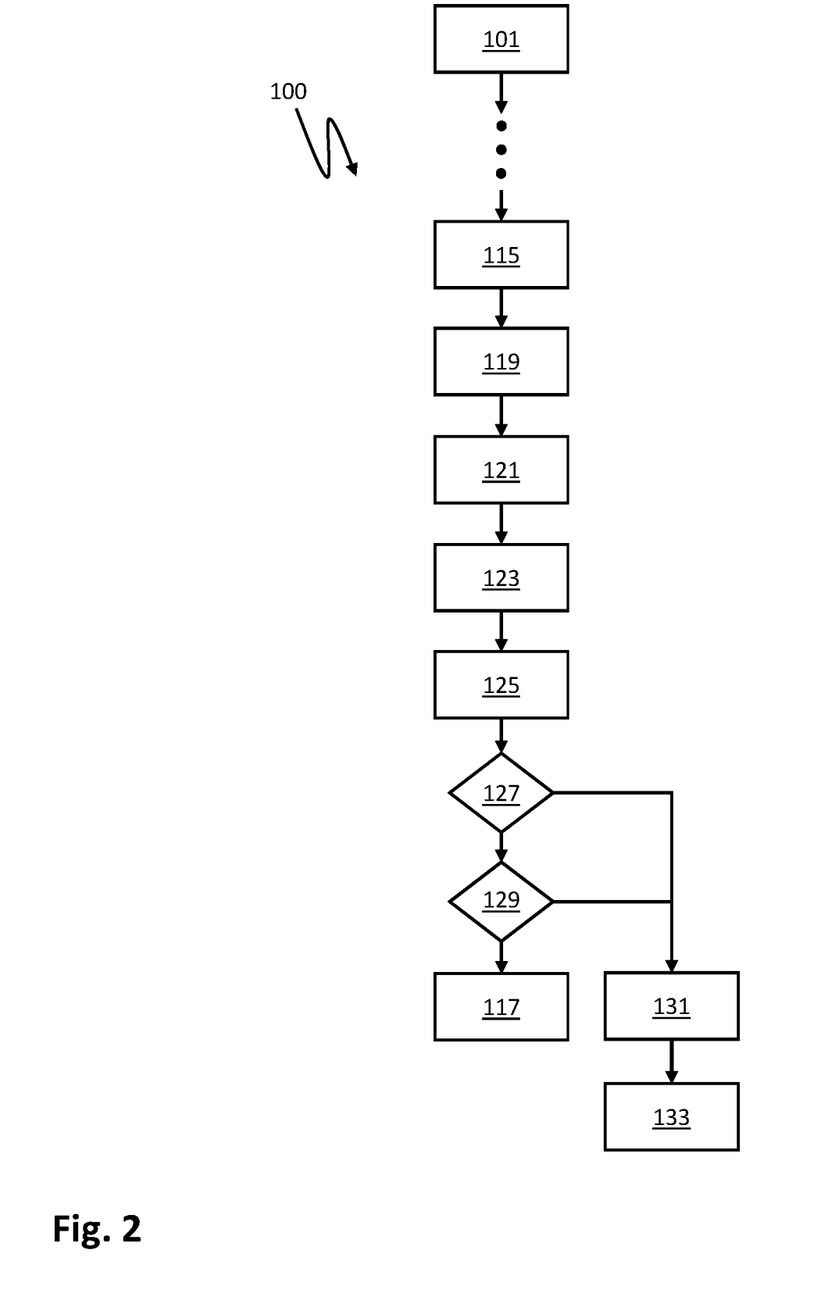
FIG. 2 is a further flow chart of the method for data communication between subscribers of an automation system according to a further embodiment.

FIG. 2 shows another flowchart of the method 100 for data communication between subscribers of an automation system according to another embodiment.

The description of the method 100 in FIG. 2 is made with reference to FIG. 3 to FIG. 5.

The embodiment of FIG. 2 is based on the embodiment in FIG. 1 and comprises all the method steps shown in FIG. 1. For the sake of clarity, the process steps of the embodiment of FIG. 1 including the third receiving step 115 are not discussed again below.

After receiving the second reply message via the active subscriber and the first passive subscriber in the third receiving step 115, a first checksum-determining step 119 is performed by the first passive subscriber to determine a first checksum. The first checksum is based on the write request or communication request sent by the active subscriber and the first reply message sent by the first passive subscriber and the second reply message received by the first passive subscriber.

In a second checksum-determining step 121, a second checksum is determined by the second passive subscriber. The second checksum is based on the write request or communication request sent by the active subscriber and the first reply message received by the second passive subscriber and the second reply message sent by the second passive subscriber.

In a third checksum-determining step 123, a third checksum is determined by the active subscriber. The third checksum is based on the write request or communication request sent by the active subscriber and the first reply message received by the active subscriber and the second reply message received by the active subscriber.

Subsequently, in a checksum-transmitting step 125, the third checksum is sent out by the active subscriber to the first passive subscriber and the second passive subscriber.

In a first checksum-checking step 127, the first passive subscriber checks the third checksum for consistency with the first checksum.

In a second checksum-checking step 129, the second passive subscriber checks the third checksum for consistency with the second checksum.

If the third checksum matches both the first checksum and the second checksum, the third checksum is interpreted as a check segment of the data element by the active subscriber in the interpreting step 117. The data element may thus be completed as a complete data telegram of a corresponding bus protocol or data communication protocol with an individual checksum.

If a deviation of the third checksum from the first checksum and/or from the second checksum is detected in the first checksum-checking step 127 and/or in the second checksum-checking step 129, the first passive subscriber and/or the second passive subscriber sends an error message in an error-message-transmitting step 131.

Subsequently, in a discarding step 133, the data element, in particular the first reply message and the second reply message, is discarded as faulty. There is no data communication or utilization of the user data contained in the reply messages of the passive subscribers.

FIG. 3 shows a schematic depiction of a timing for sending messages 247 according to the method 100 for data communication between subscribers of an automation system 200 according to an embodiment.

FIG. 3 illustrates a data communication according to the embodiment of the method 100 in FIG. 1.

FIG. 3 shows an automation system 200 comprising an active subscriber 201 and three passive subscribers 208, in particular a first passive subscriber 203, a second passive subscriber 205 and a third passive subscriber 207, the active subscriber 201 and the passive subscribers 208 being connected to each other via a bus system 209. The first passive subscriber 203 has a first switch-on unit 211. The second passive subscriber 205 comprises a second switch-on unit 213. The third passive subscriber 207 comprises a third switch-on unit 215. The passive subscribers 208 may communicate with the active subscriber 201 by sending out messages 247. For example, the bus system 209 may be embodied and set up as a party line bus system to provide sent-out messages 247 to each of the passive subscribers 208 and the active subscriber 201. In particular, the bus system 209 may be embodied to provide sent-out messages 247 to the passive subscribers 208 and the active subscriber 201 simultaneously.

In the upper area of FIG. 3, a time sequence T of a data communication according to the method 100 in the embodiment of FIG. 1 is shown. For this purpose, four different messages 247 are shown, which are located in time along a time axis with corresponding points in time. Thus, in FIG. 3, four successively transmitted and received messages 247 are shown.

The individual messages 247 each comprise different numbers of data units 245. The data units 245 may be bits, bytes, or other units for digital data communication recognized in the prior art. The messages 247 may be contiguous data packets. Preferably, the messages 247 are data packets with minimal protocol overhead, or data packets comprising only user data.

At an arbitrary point in time, denoted by a value of 0 in FIG. 3, the active subscriber 201 sends a write request 217 to the passive subscribers 208. The write request 217 addresses all passive subscribers 208 of the automation system 200 and comprises at least one request for the passive subscribers 208 to send reply messages.

The sending out of the write request 217 via the active subscriber 201 is represented by the corresponding arrow originating from the active subscriber 201. Similarly, the sending processes of the other messages 247 by the passive subscribers 208 are represented by corresponding arrows.

For example, the write request 217 may comprise a write command requesting the passive subscribers 208 to send corresponding reply messages with corresponding input data of the passive subscribers 208. Furthermore, the write request 217 may comprise a logical address of the passive subscribers 208 that may be used to address individual or multiple passive subscribers 208 of the bus system 209.

Further, the write request 217 may define a data packet length 229 indicating a number of data units 245 expected to be received from the addressed passive subscribers 208 in response to the issued write request 217. This may include the reply messages from the passive subscribers 208 including a checksum message.

The data unit numbers of the reply messages of each passive subscriber 208 may be predefined, such that each passive subscriber 208 may exclusively send reply messages having the same predefined data length. Alternatively, the data lengths of different reply messages of a passive subscriber 208 may vary.

At a 0th time T0, the issued write request 217 is received by the passive subscribers 208. The receipt of the write request 217, as incidentally the receipt of all further messages 247, comprises the receipt of all data units 245 of the respective received message 247.

Upon receipt of the write request 217 by the first passive subscriber 203, the first passive subscriber 203 transmits a first reply message 219 at a first transmission time T1.

In the embodiment shown in FIG. 3, a transmission gap G is inserted between each successive message 247. In the embodiment shown in FIG. 3, the bus system 209 is operated according to the UART protocol and the passive subscribers 208 or the active subscriber 201 are only switched to a transmitting mode for sending the messages 247. If no message 247 is transmitted, the active subscriber 201 or the passive subscribers 208 are in a receiving mode in which they are set up to receive transmitted messages 247. The transmission gap G between receiving a message 247 and transmitting another message 247, e.g. between receiving the write request 217 at the 0th time T0 and transmitting the first reply message 219 at the first transmission time T1, takes into account the switch-over of the transmitting subscriber of the previous message 247, e.g. the first active subscriber 201, from the transmitting mode to the receiving mode.

The delay of the transmission time with respect to the receipt timing according to the transmission gap G may be taken into account in the switch-on units of the passive subscribers 208. The determination of the transmission time by the switch-on units according to the counting operations of the data units 245 received after the receipt of the write request 217 performed in the counting steps is not affected by the transmission gap G to be taken into account.

Since no data units 245 are sent and no data units 245 are received in the transmission gaps, the transmission gaps G contribute the zero value to the first count Z1, second count Z2, and third count Z3 shown in FIG. 3.

In the embodiment shown in FIG. 3, for the first switch-on unit 211 of the first passive subscriber 203, the first number Z1 of data units 245 received after receipt of the write request 217 corresponds to the numerical value 0.

Thus, the first passive subscriber 203 transmits the first reply message 219 according to the first reply step 107 after receiving the write request 217 at the 0th time T0 and the expiration of the first transmission gap G at the 1-th time T1. In the first determining step 105, a counting process is thus performed by the first switch-on unit 211 in accordance with the first counting step 135, in which zero data units 245 to be received are counted, so that transmission of the first reply message 107 takes place immediately after receipt of the write request 217 by the first passive subscriber 203, and thus no further data units 245 are received after receipt of the write request 217 and before transmission of the first reply message 219 in the first reply step 107 by the first passive subscriber 203.

In the embodiment shown in FIG. 3, the first reply message 219 has a first data unit count 239 and comprises four data units 245.

After sending the first reply message 219, the active subscriber 201, the second passive subscriber 205, and the third passive subscriber 207 receive the first reply message 219 at the first receipt time T10 according to the second receiving step 109. The receipt of a message 247 occurs at the time of receipt of the last data unit 245 of the respective message 247.

After receiving the first reply message 219, the second switch-on unit 213 of the second passive subscriber 205 performs a determination of the second transmission time T2 according to the second determining step 111 by counting the received data units 245 after receiving the write request 217 at the 0th time T0 according to the second counting step 137. In the embodiment shown in FIG. 3, since Z1 is zero and does not contribute to the second number Z2, the second switch-on unit 213 corresponds to the first data unit number 239 of the first reply message 219. Thus, in the second embodiment, the second number Z2 corresponds to the numerical value 4.

After receiving the write request 217 at the 0th point in time T0, the second switch-on unit 213 performs the second counting step 137 and counts the data units 245 received by the second passive subscriber 205. After receiving the first reply message 219, the second passive subscriber 205 has received four data units 245 of the first reply message 219. Thus, the second switch-on unit 213 has reached the second number Z2 in the second counting step 137 after receiving the first reply message 219 at the first receipt time T10. Thus, the second passive subscriber 205 transmits a second reply message 221 at a second transmission time T2 after receiving the first reply message 219 and the expiration of a further transmission gap G. After receiving the first reply message 219 and before the second passive subscriber 205 transmits the second reply message 221, no further data units 245 are received by the second passive subscriber 205.

In the embodiment shown in FIG. 3, the transmitted second reply message 221 comprises three data units 245 and a second data unit count 241.

The second reply message 221 transmitted by the second passive subscriber 205 according to the second reply step 113 is received by the active subscriber 201, by the first passive subscriber 203 and by the third passive subscriber 207 at the second receipt time T20.

Analogously to the first determining step 105 and the second determining step 111, the third passive subscriber 207 or the third switch-on unit 215, respectively, determine a third transmission time T3 for transmitting a third reply message 223. For this purpose, a counting process of the data units 245 received by the third passive subscriber 207 after receipt of the write request 217 is performed according to the first counting step 135 and the second counting step 137. In order to determine the third transmission time T3, the third switch-on unit 215 comprises a third number Z3 of data units 245 to be received, which indicates at which number of received data units 245 a reply message is to be transmitted by the third passive subscriber 207.

In the embodiment shown in FIG. 3, the third number Z3 corresponds to a sum of the first number Z1, which in the present embodiment has a value of zero, of the first data unit number 239 of the first reply message 219, and of the second data unit number 241 of the second reply message 221. Thus, the third number Z3 corresponds to the numerical value of 7.

Thus, after receiving the second reply message 221 at the second receipt time T20 by the third passive subscriber 207, the third passive subscriber 207 has received seven data units 245 after receiving the write request 217 at the 0th time T0, thus reaching the third number Z3. The third switching unit 215 thus causes a third reply message 223 to be transmitted at a third transmission time T3 after receiving the second reply message 221 at a second receipt time T20 and after the corresponding transmission gap G has elapsed. After receiving the second reply message 221 at the second receipt time T20 and before transmitting the third reply message 223 at the third transmission time T3, the third passive subscriber 207 thus does not receive any further data units 245.

The third reply message 223 is sent out analogously to the first reply step 107 or to the second reply step 113. In the embodiment shown in FIG. 3, the third reply message 223 comprises five data units 245 and a third data unit count 243. At a third receipt time T30, the active subscriber 201, the first passive subscriber 203 and the second passive subscriber 205 receive the third reply message 223.

According to the interpreting step 117, the active subscriber 201 interprets the received first reply message 219, the received second reply message 221, and the received third reply message 223 as a contiguous data packet.

In FIG. 3, the second subscriber 205 is arranged in the third position or the third subscriber 207 is arranged in the second position within the bus system 209. This illustrates that the transmission order of the transmitted reply messages is not tied to the order of the arranged passive subscribers 208 in the bus system 209. The transmission order of the messages 247, or reply messages, to be transmitted may be changed independently of the arrangement of the passive subscribers 208 in the bus system 209 by corresponding definitions within the switch-on units of the corresponding passive subscribers 208. By correspondingly defining the transmission times of the reply messages in the corresponding switch-on units, any transmission order may be realized.

The passive subscribers 208 may e.g. be embodied as sensors or actuators of the automation system 200. The switch-on units of the passive subscribers 208 may be arranged within the passive subscribers 208 and may be embodied as an Application Specific Integrated Circuit ASIC.

The reply messages from the individual passive subscribers 208 may include user data, particularly measurement data or status data of the passive subscribers 208.

The messages 247 sent out by the active subscriber 201 and the passive subscribers 208 may be embodied as self-contained data elements. In particular, in accordance with the UART protocol, the messages 247 may have minimal protocol overhead or may exclusively comprise user data. According to the UART protocol, the messages 247 may each comprise a start bit and a stop bit for identifying the start and the end of the respective message 247 and, as the case may be, a parity bit a possible verification of the correctness of the transmitted data and a data unit 245, respectively, of the transmitted message 247. According to the UART protocol, the bus system 209 may be operated at a high level, i.e., a high voltage level, between the transmission of messages 247. The start bits, stop bits, and parity bits of the transmitted messages 247 may be taken into account in the count steps of the method 100 as transmitted data units 245. Alternatively, individual data units 245 may have start bits, stop bits, and parity bits.

FIG. 4 shows another schematic depiction of a timing of a sending of messages 247 according to the method 100 for data communication between subscribers of an automation system 200 according to an embodiment.

In FIG. 4, building on the transmission process shown in FIG. 3, the method 100 according to the embodiment of FIG. 2 is illustrated. For the sake of clarity, some of the elements shown in FIG. 3, which are not important in connection with the description of FIG. 4, have not been included in the illustration of FIG. 4.

After receiving the first reply message 219, the second reply message 221 and the third reply message 223 via the active subscriber 201, the first passive subscriber 203, the second passive subscriber 205, and the third passive subscriber 207, respectively, a first checksum is determined by the first passive subscriber 203 in the first checksum-determining step 119. The first checksum is based on the write request 217 issued by the active subscriber 201, the first reply message 219 issued by the first passive subscriber 203 and the second reply message 221 received by the first passive subscriber 203 and the third reply message 223 received by the first passive subscriber 203.

In a second checksum-determining step 121, the second passive subscriber 205 determines a second checksum. The second checksum relates to the write request 217 issued by the active subscriber 201, the first reply message 219 received by the second passive subscriber 205, the second reply message 221 issued by the second passive subscriber 205, and the third reply message 223 received by the second passive subscriber 205.

According to a further checksum-determining step, the third passive subscriber 207 determines a further checksum. The further checksum is based on the write request 217 sent out by the active subscriber 201, the first reply message 219 received by the third passive subscriber 207, and the second reply message 221 received by the third passive subscriber 207 and the third reply message 223 sent out by the third passive subscriber 207.

In a third checksum-determining step 123, the active subscriber 201 determines the third checksum. The third checksum is based on the write request 217 issued by the active subscriber 201, on the first reply message 219, the second reply message 221, and the third reply message 223 received by the active subscriber 201.

Subsequently, in accordance with the checksum-transmitting step 125, the active subscriber 201 sends the third checksum to the passive subscribers 208 in a checksum message 226 at a fourth transmission time T4. After receiving the checksum message 226 by the passive subscribers 208 at a fourth receipt time T40, the passive subscribers 208 check the third checksum for consistency with the respective checksums generated by the passive subscribers 208 in accordance with the checksum-checking steps of the method 100. Thus, the first passive subscriber 203 checks the third checksum against the generated first checksum. The second passive subscriber 205 checks the third checksum against the generated second checksum. The third passive subscriber 207 checks the third checksum against the generated further checksum.

If the checksum verification steps determine that a discrepancy exists between the checksums generated by the passive subscribers 208 and the third checksum of the active subscriber 201, the respective passive subscriber 208 sends an error message 225 in accordance with the error-message-transmitting step 131. For this purpose, the active subscriber 201 may be assigned a waiting period during which the active subscriber 201 waits for the receipt of a corresponding error message 225 by at least one of the passive subscribers 208 after sending the third checksum. If the active subscriber 201 does not receive an error message 225 from at least one passive subscriber 208 during the corresponding waiting period, the active subscriber 201 may interpret this as a match between the third checksum and the checksums calculated by the passive subscribers 208. If, on the other hand, the active subscriber 201 receives an error message 225 from at least one passive subscriber 208 during the waiting period after transmission of the third checksum, this is interpreted as a mismatch between the third checksum and at least one of the checksums calculated by the passive subscribers 208, and the transmission of the totality of the transmitted reply messages is interpreted as faulty.

In the embodiment shown in FIG. 4, a deviation of the third checksum from the second checksum was detected by the second passive subscriber 205, and a deviation of the third checksum from the generated further checksum was detected by the third passive subscriber 207. At a fifth transmission time T5, the second passive subscriber 205 and the third passive subscriber 207 transmit a joint error message 225, which is received at a fifth receipt time T50 by the active subscriber 201 and the respective passive subscribers 208. An error message 225 may e.g. be a low-level message comprising multiple data units 245 in which the bus system 209 is brought to a low voltage level. In this way, multiple passive subscribers 205 may simultaneously transmit an error message 225. By sending out the error message 225, the data packet comprising the first reply message 219, the second reply message 221, and the third reply message 223 is discarded and the information in the reply messages from the passive subscribers 208 is not further taken into account.

In the event that the passive subscribers 208 identify a match between the third checksum and the checksums generated by the passive subscribers 208, the third checksum is understood by the active subscriber 201 to be a check segment of the data segment. A match may be inferred by the active subscriber 201 from the absence of a corresponding error message 225 by one of the passive subscribers 208. Alternatively, if the third checksum matches the checksums generated by the passive subscribers 208, a match message may be sent by the passive subscribers 208 to the active subscriber 201 during the waiting period.

The embodiment of the method 100 and the automation system 200 shown in FIG. 3 and FIG. 4 is exclusively intended solely to illustrate basic mechanisms of the method 100 and features of the automation system 200. It is not intended to limit the present invention to the description given with respect to FIG. 3 and FIG. 4. The method 100 may be varied in various aspects. For example, the method 100 may be applied to any number of active subscribers 201 and passive subscribers 208 of an automation system 200. The messages 247 presented, in particular the number of data units 245 of the messages 247, may be varied as desired. The number of reply messages sent out by the passive subscribers 208 may also be varied as desired. The individual numbers of data units 245 to be received defined in the switch-on units of the passive subscribers 208 may be varied as desired. In particular, the respective numbers may be predetermined in the respective switch-on units. Alternatively, the various numbers may be variably defined.

FIG. 5 shows a schematic depiction of a data packet 227 generated by the method 100, according to an embodiment.

In FIG. 5, the first reply message 219, the second reply message 221, and the third reply message 223 from FIG. 3 and FIG. 4 are combined into a data element 227. Here, the first reply message 219, or the four data units 245 of the first reply message 219 form a first data segment 231 of the data element 227. The three data units 245 of the second reply message 221 form a second data segment 233. The five data units 245 of the third reply message 223 form a third data segment 235 of the data element 227. Furthermore, the third checksum from the checksum message 226 is integrated into the data element 227 as a data unit 245 of a check segment 237. However, if the active subscriber 201 does not receive any match messages during the waiting period, the active subscriber 201 may interpret this as a mismatch of the third checksum with at least one of the checksums of the passive subscribers 208, and the transmission of the totality of the transmitted reply messages is interpreted as faulty comparable to the receipt of an error message 225.

Furthermore, the data packet 227 comprises a header segment 238 with 3 data units 245 shown here as an example. The header segment 238 may in particular comprise the write request 217. With the header segment 238, the first data segment 231, the second data segment 233, the third data segment 235 and the check segment 237, the data packet 227 is formed as a complete data telegram of a corresponding bus protocol. By combining the reply messages in the data packet 227, which is embodied as a data telegram, the user data of the individual passive subscribers 208 of the automation system 200 may be further processed as a common piece of information, e.g. of an overall status of the passive subscribers 208 in a contiguous data telegram in the course of an automation process to be controlled by the automation system 200.

In the embodiment shown in FIG. 5, the data packet length 229 defined in the write request 217 includes the data units 245 of the first reply message 219, the second reply message 221, the third reply message 223, and the checksum message 226.

Alternatively, the data element 227 may be embodied with a different arrangement of the segments of the data element 227 than that shown in FIG. 5. The data units 245 shown in FIG. 5, in particular the number of data units 245 shown in FIG. 5, is for illustrative purposes only and may be changed as desired.

This invention has been described with respect to exemplary examples. It is understood that changes can be made and equivalents can be substituted to adapt these disclosures to different materials and situations, while remaining with the scope of the invention. The invention is thus not limited to the particular examples that are disclosed, but encompasses all the examples that fall within the scope of the claims.

TABLE 1

List of reference numerals

| | |
|---|---|
| 100 method for data communication between subscribers of an automation system | 200 automation system |
| | 201 active subscriber |
| | 203 first passive subscriber |
| | 205 second passive subscriber |
| 101 transmitting step | 207 third passive subscriber |
| 103 first receiving step | 208 passive subscriber |
| 105 first determining step | 209 bus system |
| 107 first reply step | 211 first switch-on unit |
| 109 second receiving step | 213 second switch-on unit |
| 111 second determining step | 215 third switch-on unit |
| 113 second reply step | 217 write request |
| 115 third receiving step | 219 first reply message |
| 117 interpreting step | 221 second reply message |
| 119 first checksum-determining step | 223 third reply message |
| | 225 error message |
| 121 second checksum-determining step | 226 checksum message |
| | 227 data package |
| 123 third checksum-determining step | 229 data packet length |
| | 231 first data segment |

TABLE 1-continued

List of reference numerals

| | |
|---|---|
| 125 checksum-sending step | 233 second data segment |
| 127 first checksum-checking step | |
| 129 second checksum-checking step | |
| 131 error-message-sending step | |
| 133 discarding step | |
| 135 first counting step | |
| 137 second counting step | |
| | 235 third data segment |
| | 237 test segment |
| | 238 header segment |
| | 239 first data unit number |
| | 241 second data unit number |
| | 243 third data unit number |
| | 245 data unit |
| | 247 message |

TABLE 2

List of reference symbols

| | |
|---|---|
| T0 $0^{th}$ receipt time | Z1 first number |
| T1 first transmission time | Z2 second number |
| T10 first receipt time | Z3 third number |
| T2 second transmission time | G transmission gap |
| T20 second receipt time | |
| T3 third transmission time | |
| T30 third receipt time | |
| T4 fourth transmission time | |
| T40 fourth receipt time | |
| T5 fifth transmission time | |
| T50 fifth receipt time | |

The invention claimed is:

1. A method for data communication between subscribers of an automation system having an active subscriber and at least two passive subscribers, which comprise at least a first passive subscriber and a second passive subscriber, the active subscriber and the passive subscribers being connected to one another via a bus system, the active subscriber being set up to initiate data communication by transmitting communication requests and the passive subscribers being set up to send out corresponding reply messages in response to the communication requests, wherein the first passive subscriber comprises a first switch-on unit for determining a first transmission time for transmitting a first reply message via the first passive subscriber, and wherein the second passive subscriber comprises a second switch-on unit for determining a second transmission time for transmitting a second reply message via the second subscriber, the method comprising:

receiving a write request sent by the active subscriber to send reply messages by the first passive subscriber and the second passive subscriber in a first receiving step;

counting data units received after receipt of the write request by the first passive subscriber until a first number is reached by the first switch-on unit in a first counting step and determining the first transmission time point for transmitting the first reply message via the first switch-on unit of the first passive subscriber in a first determining step, wherein the first transmission time corresponds to a point in time at which a number of data units received by the first passive subscriber according to a predefined data transmission rate after receiving of the write request equals the first number;

sending out the first reply message at the first transmission time by the first passive subscriber in a first reply step;

receiving the first reply message by the active subscriber and the second passive subscriber in a second receiving step;

counting data units received after receipt of the write request via the second passive subscriber until a second number is reached by the second switch-on unit in a second counting step and determining the second transmission time for transmitting the second reply message by the second switch-on unit in a second determining step, wherein the second transmission time corresponds to a point in time at which a number of data units received by the second passive subscriber according to the predefined data transmission rate after receiving the write request equals the second number;

sending out the second reply message at the second transmission time by the second passive subscriber in a second reply step;

receiving the second reply message by the active subscriber and the first passive subscriber in a third receiving step; and interpreting the first reply message and the second reply message as a first data segment and a second data segment of a data packet by the active subscriber in an interpreting step.

2. The method of claim 1, further comprising:

determining a first checksum by the first passive subscriber in a first checksum-determining step, wherein the first checksum is generated with regard to the write request issued by the active subscriber, the first reply message issued by the first passive subscriber, and the second reply message received by the first passive subscriber, and/or determining a second checksum by the second passive subscriber in a second checksum-determining step, wherein the second checksum is generated with the regard to the write request issued by the active subscriber, the first reply message received from the second passive subscriber, and the second reply message issued from the second passive subscriber;

determining a third checksum by the active subscriber in a third checksum-determining step, wherein the third checksum is generated with the regard to the write request issued by the active subscriber, the first reply message received by the active subscriber, and the second reply message received by the active subscriber;

sending out the third checksum by the active subscriber to the first passive subscriber and the second passive subscriber in a checksum-transmitting step;

checking the third checksum for correspondence with the first checksum by the first passive subscriber in a first checksum-checking step, and/or checking the third checksum for correspondence with the second checksum by the second passive subscriber in a second checksum-checking step; and if the third checksum does not match the first checksum and/or the second checksum: sending out an error message by the first passive subscriber and/or the second passive subscriber in an error-message-transmitting step, and discarding the first reply message and/or the second reply message and/or the data packet by the active subscriber and/or the first passive subscriber and/or the second passive subscriber in a discarding step.

3. The method according to claim 2, further comprising: if the third checksum matches the first checksum and the second checksum, interpreting the third checksum as a test segment of the data packet in the interpreting step.

4. The method according to claim 1, wherein the first number is any numerical value, and wherein the second number is not smaller than a sum of the first number and a first data unit number of the first reply message, wherein the first data unit number corresponds to a number of data units of the first reply message.

5. The method according to claim 1, wherein the first number is defined in the first switch-on unit, and wherein the second number is defined in the second switch-on unit.

6. The method according to claim 1, wherein the write request further defines a data packet length of the data packet, and wherein the data packet length of the data packet comprises at least a sum of a first data unit number of the first reply message and a second data unit number of the second reply message, wherein the second data unit number corresponds to a number of data units of the second reply message.

7. The method according to claim 1, wherein the active subscriber, the first passive subscriber and the second passive subscriber each transition from a receiving mode to a transmitting mode exclusively for transmitting data units, wherein transmitted data units are configured with a start bit, a stop bit and a parity bit, wherein the start bit of a data unit represents the start and the stop bit of a data unit represents the end of the respective data unit, and wherein the bus system is operated at a high voltage level between the transmission of data units.

8. The method according to claim 1, wherein the bus system is configured as a party-line bus system, and wherein transmitted data units are simultaneously available to all subscribers of the bus system.

9. The method according to claim 1, wherein the first reply message comprises user data of the first passive subscriber and the second reply message comprises user data of the second passive subscriber.

10. The method according to claim 1, wherein the first passive subscriber and the second subscriber are each configured as an actuator or sensor of the automation system, and wherein the active subscriber is a bus master of the bus system.

* * * * *